No. 642,859. Patented Feb. 6, 1900.
H. P. WHITE.
SYSTEM OF ELECTRICAL DISTRIBUTION.
(Application filed Sept. 26, 1898.)

(No Model.)

Witnesses:
H. S. Wood
Otis A. Earl

Inventor,
Henry P. White
By Fred L. Chappell
Att'y.

UNITED STATES PATENT OFFICE.

HENRY P. WHITE, OF KALAMAZOO, MICHIGAN, ASSIGNOR OF THREE-FOURTHS TO CHARLES D. FULLER, OF SAME PLACE.

SYSTEM OF ELECTRICAL DISTRIBUTION.

SPECIFICATION forming part of Letters Patent No. 642,859, dated February 6, 1900.

Application filed September 26, 1898. Serial No. 691,964. (No model.)

*To all whom it may concern:*

Be it known that I, HENRY P. WHITE, a citizen of the United States, residing at the city of Kalamazoo, in the county of Kalamazoo and State of Michigan, have invented certain new and useful Improvements in Systems of Electrical Transmission, Conversion, and Distribution, of which the following is a specification.

This invention relates to devices for the transmission, conversion, and distribution of electrical energy.

The objects of my invention are, first, to furnish an economical means of converting an alternating current to a direct current; second, to furnish a two-wire system of electrical transmission and means of conversion and distribution in connection therewith; third, to furnish a system of converting the alternating current to a direct current which shall be adjustable and applicable to any alternating current regardless of its periods of phase alternations; fourth, to produce, in a system of long-distance transmission, conversion, and distribution of electrical energy, a saving of a large amount of the material and apparatus heretofore necessary in conducting, transforming, and converting the currents used; fifth, to furnish, in a system of transmission, conversion, and distribution of electrical energy, means of displacing the phase adjustably to suit currents of different periods of alternations; sixth, to furnish, in a system of transmission, conversion, and distribution of electrical energy, a means of displacing simultaneously and equally and also adjustably the phases in branches of one or more independent alternating circuits, and, seventh, to furnish, in a system of transmission, conversion, and distribution of electrical energy, means of displacing the phase in a plurality of branches or circuits simultaneously and equally.

Other and further objects will fully appear in the specification.

I accomplish the objects of my invention by the mechanism, means, and methods which are clearly described in the specification.

The invention is clearly pointed out and defined in the claims.

The means are fully illustrated in the accompanying drawings, forming a part of this specification, in which—

Figure 1:
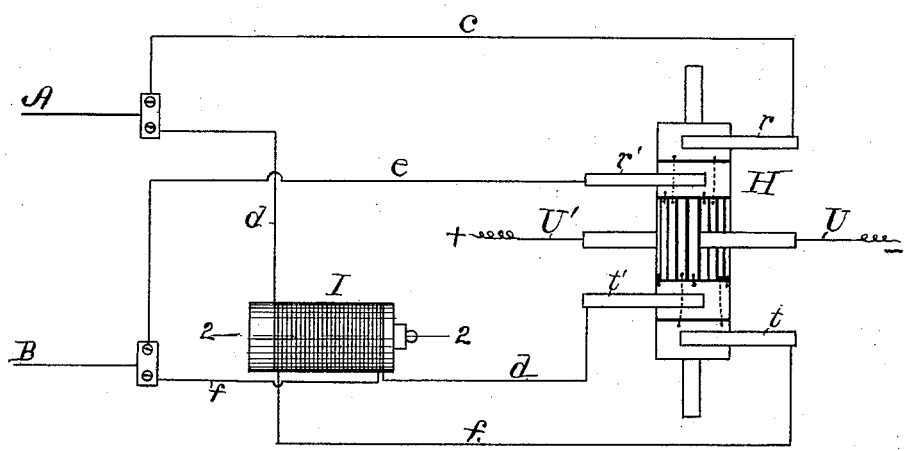
Figure 2:
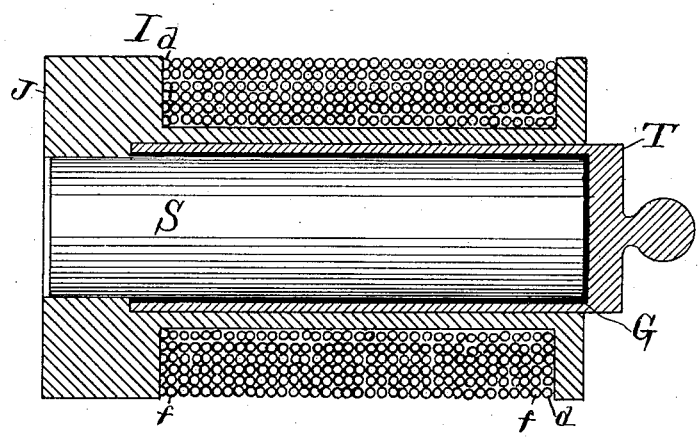

Figure 1 is a diagrammatical view showing the arrangement and construction of the various parts. Fig. 2 is a longitudinal detail sectional elevation taken on line 2 2 of Fig. 1, showing the formation of an improved phase-displacer for use in this connection.

In the drawings similar letters of reference refer to similar parts throughout both views.

Referring to the lettered parts of the drawings, A and B represent terminals of a source of an alternating electric current.

H represents a commutator. This commutator is made on the same plan and connected in the same way as the commutator described in my Patent No. 550,703, dated December 3, 1895, the operation of which will be readily understood from an examination of the said patent, as will also the arrangement of the brushes here shown, which are arranged in the same way.

The terminals or lines A and B, delivering the alternating current, are divided. The terminal A has branches $c$ and $d$, the branch $c$ connecting to the brush $r$ on the outside at one end of the commutator and the other branch $d$ passing through the phase-displacer I and connecting to the brush $t'$, resting on the inside ring of the opposite side of said commutator. The terminal B is divided into branches $e$ and $f$, the branch $e$ connecting through the brush $r'$ to the inside ring of the commutator opposite the connection to branch $c$ and the branch $f$ passing through the phase-displacer I and connecting through the brush $t$ to the outside ring of the commutator. The branches $d$ and $f$, consisting of suitable conductors, are wound into coils, both of the wires being wound onto a core J, similar to that used in the formation of ordinary induction-coils, except that the wires are here wound parallel with each other. This coil is made up of a spool J, on which the wires are wound, containing a magnetic core S, which is surrounded by an adjustable slide T, which is lined with insulating material G. The branches $f$ and $d$ are wound into this coil and connected in such a manner that the signs of the current phase in each case shall be the same. As the wires are parallel and the number of coils necessarily equal, the amount of displacement due to the coil and amount of induction and resistance within the same will be exactly equal. The withdrawing of the shield T will expose more of the coils to the magnet S, increasing their induction, and as the coils are parallel and side by side the phase displacement in it will be exactly the same and simultaneous. By the proper adjustment of said shield the phases of the branches or circuits $d$ and $f$ can be displaced substantially to the exact quarter, and when the phases are so displaced the commutator H, as will be seen from the description appearing in my former patent, will deliver all of the alternating current as direct current through the conductors U U', connecting to the brushes resting on the segments. If the phase is only slightly displaced, a small portion of the current will be so delivered and a larger portion as the displacement approaches to the exact quarter.

In this connection I desire to state that the details of the structure here shown can be greatly varied without departing from my invention. Any kind or number of phase-displacers of the proper capacity for any particular current can be substituted for my adjustable phase-displacer I. I also desire to state in this connection that the phase-displacer means I have here shown is capable of use in other relations and that it need not be confined in its structure to two coils, for as many coils of wire can be wound together as it is desired to utilize in acting upon a corresponding number of circuits or branches, it being required that the coils correspond in number and shall be equal and parallel in order that the displacement on each shall be equal and simultaneous. I also desire further to state that the special form of commutator or converter is not essential, but that other forms may be adapted and utilized, and while the rotary commutator at the present time is best for the purpose I am inclined to believe that other styles will be produced which would perform the same functions equally well.

From the above description it clearly appears that when the two independent circuits $c e$ and $d f$, each of which is properly connected with the commutator H and one of which, $d f$, contains within each branch of its circuit a phase-displacer I, and are energized by a source of alternating current A B the current phase in the circuit $d f$ will be moved from its normal position by the action of said phase-displacer. If said commutator be revolved synchronously with the current phases of said independent circuits, a direct current will circulate through the brushes U U', from which point it may be utilized by ordinary means for any purpose desired. It will readily be seen that by a proper adjustment of the style of phase-displacer shown the full equivalent of the alternating current can be taken off as direct current from the commutator; also, that an adjustable phase-displacer would obviate the necessity of using two or more of the common type, each of which would have to be built especially to secure the desired phase displacement of the current used. I therefore do not limit myself to any special construction of phase-displacers, or to any particular number of the same, or to any particular construction of converter, as my invention consists in arranging in one of two independent circuits having a common source proper phase displacement in each of its branches in connection with a commutator to secure the results above described.

In this connection I desire to state that I am aware it is old to secure phase displacement by varying the resistance and self-induction of the different independent circuits having a common source, as in the application of the alternating current to a field-magnet of the rotary field type; also, that it is old to convert alternating currents by means of a commutator when proper phase displacement exists; but heretofore such displacement of the current phase has been secured by specially-constructed generators which are commonly operated under what is known as the "three-wire" system. All of these I disclaim; but I believe it to be new to produce phase displacement in each branch of one of two independent circuits having a common source. I also believe it to be new to combine such phase displacement with a commutator to secure the result described.

Having thus described my invention, what I claim as new, and desire to secure by Letters Patent, is—

1. In a system of transmission, conversion and distribution of electrical energy the combination of a source of alternating current with conductors divided into branches to form a plurality of circuits, an adjustable phase-displacer suitably connected in each branch of one of two independent circuits of said source and a commutator for the purpose specified.

2. In a system of transmission, conversion and distribution of electrical energy the combination of a source of alternating current with conductors divided into branches to form a plurality of circuits, phase-displacers suitably connected in each branch of one of two independent circuits of said source and a commutator for the purpose specified.

3. In a system of transmission, conversion and distribution of electrical energy the combination of a source of alternating current with conductors divided into branches to form a plurality of circuits, means for phase displacement contained in each branch of one of two independent circuits of said source, and a commutator for the purpose specified.

4. In a system of transmission, conversion, and distribution of electrical energy, the combination of a source of alternating current with conductors therefor divided into branches to form two independent circuits, and a phase-displacer in one branch of each of the conductors that are paired to form a circuit to form circuits of different phase.

5. In a system of transmission, conversion and distribution of electrical energy, the combination of a source of alternating current with conductors therefor divided into branches, with means for phase displacement in one branch of each conductor, and a commutator, for the purpose specified.

6. A phase-displacer for use in an alternating current consisting of a plurality of parallel coils corresponding to the number of circuits to be acted upon; a suitable magnetic core with adjustable shield to vary the amount of resistance and induction simultaneously and equally in each.

7. A phase-displacer for use in an alternating-current circuit, consisting of a plurality of parallel coils corresponding to the number of circuits to be acted upon so that the amount of resistance and induction shall be equal, as specified.

In witness whereof I have hereunto set my hand and seal in the presence of two witnesses.

HENRY P. WHITE. [L. S.]

Witnesses:
CHARLES D. FULLER,
OTIS A. EARL.